United States Patent
Lee

(10) Patent No.: US 11,165,283 B2
(45) Date of Patent: Nov. 2, 2021

(54) POWER SUPPLY DEVICE AND METHOD FOR USING THE SAME

(71) Applicant: LINENG TECHNOLOGY CO., LTD., Hsinchu (TW)

(72) Inventor: Chih-Yu Lee, Hsinchu (TW)

(*) Notice: Subject to any disclaimer, the term of this patent is extended or adjusted under 35 U.S.C. 154(b) by 112 days.

(21) Appl. No.: 16/719,964

(22) Filed: Dec. 18, 2019

(65) Prior Publication Data

US 2020/0203996 A1 Jun. 25, 2020

(30) Foreign Application Priority Data

Dec. 25, 2018 (TW) .................................. 107146902

(51) Int. Cl.
*H02J 50/12* (2016.01)
*H02J 50/80* (2016.01)
*H02J 50/20* (2016.01)

(52) U.S. Cl.
CPC .............. *H02J 50/12* (2016.02); *H02J 50/80* (2016.02); *H02J 50/20* (2016.02)

(58) Field of Classification Search
CPC .......... H01Q 1/38; H01Q 1/422; H01Q 1/424; H02J 50/402; H02J 50/00; H02J 50/005; H02J 50/10; H02J 50/23; H02J 50/70
USPC .......... 307/104, 149; 320/101, 108; 343/895
See application file for complete search history.

(56) References Cited

U.S. PATENT DOCUMENTS

| | | | | |
|---|---|---|---|---|
| 2011/0175461 A1* | 7/2011 | Tinaphong | ............ | H02J 50/402 307/149 |
| 2011/0309686 A1* | 12/2011 | Scherbenski | ............ | H02J 7/025 307/104 |
| 2016/0149441 A1* | 5/2016 | Nayak | ............ | H01Q 21/06 307/149 |
| 2020/0194874 A1* | 6/2020 | De Sousa | ............ | H01Q 7/00 |

* cited by examiner

*Primary Examiner* — Toan T Vu
*Assistant Examiner* — Elim Ortiz
(74) *Attorney, Agent, or Firm* — Lin & Associates Intellectual Property, Inc.

(57) ABSTRACT

A power supply device includes: a plurality of resonant coils each having a resonant portion and a power transmission portion electrically connected to the resonant portion, the resonance portion receives electromagnetic waves of a different frequency, and converts electromagnetic waves of different frequencies into electric energy; and a power converting unit electrically connected to the power transmission portion to receive the electrical energy from the power transmission portion, and storing the electrical energy. A user uses the resonant coil to generate power by the resonance of the resonant coil with the electromagnetic waves in natural environment, and the power is stored in the power converting unit. The electric power converting unit does not need to store electricity through the power source, and only needs to use the electromagnetic waves in the environment to generate electrical energy, which facilitates the user to store electricity in the power converting unit.

2 Claims, 8 Drawing Sheets

POWER SUPPLY DEVICE AND METHOD FOR USING THE SAME

BACKGROUND

Field of the Invention

The present invention provides a power supply device for a magnetic resonance wireless power transmission system, and relates to magnetic coupling resonance (magnetic phase synchronization coupling; magnetic resonance phase modulation; resonant inductive coupling) generated by magnetic resonance or a field effect to wireless charge a power supply device; and the present invention relates to a technical field of generating electric power, and particularly to a power supply device capable of being charged by electromagnetic waves existing in the natural environment.

The present invention further relates to a method of using the foregoing power supply device, and by using the method to capture electromagnetic waves existing in the natural environment, converting electromagnetic waves in the environment into electrical energy for storage and utilization.

Related Prior Art

Please refer to FIG. 1, a conventional wireless power supply system 60 generally includes a wireless power output terminal 61 and a wireless power receiving terminal 62. The wireless power output terminal 61 is usually connected to a power source B, and the electrical energy from the power source is converted into a resonant magnetic field A by a power supply resonant coil 611. The wireless power receiving terminal 62 has a power receiving resonant coil 621 to receive and convert the resonant magnetic field A generated by the power supply resonant coil 611 into electrical energy, and the power receiving resonant coil 621 is electrically connected to a power receiving portion 622, and converts the electromagnetic wave generated by the power receiving resonant coil 621 into electrical power for the power receiving unit 622 to use.

However, the wireless power supply system 60 needs to rely on the power supply resonant coil 611 of the wireless power output terminal 61 for power transmission, and the wireless power receiving terminal 62 can only receive electromagnetic waves transmitted by the wireless power output terminal 61, so that the user still needs to move the wireless power receiving terminal 62 to the position of the wireless power supply terminal 61 to enable charging.

The present invention has arisen to mitigate and/or obviate the afore-described disadvantages.

SUMMARY

One objective of the present invention is to solve the problem that the wireless power receiving terminal can only receive the electromagnetic waves from the wireless power supply terminal, resulting in that the position for charging is limited.

To achieve the above objective, a power supply device in accordance with the present invention comprises:

a plurality of resonant coils each having a resonant portion and a power transmission portion electrically connected to the resonant portion, wherein the resonance portion of each of the resonant coils respectively receives electromagnetic waves of a different frequency, and converts electromagnetic waves of different frequencies into electric energy; and a power converting unit electrically connected to the power transmission portion of each of the resonant coils to receive the electrical energy from the power transmission portion, and storing the electrical energy.

Preferably, the power supply device further comprises a carrying unit, and the resonant coils and the power converting unit are disposed on the carrying unit.

Preferably, the power supply device further comprises a plurality of carrying units, and each of the carrying units is provided with at least one said resonant coil.

Preferably, the power supply device further comprises a plurality of insulating units, and there is at least one said insulating unit between each two of the carrying units.

Preferably, there are a plurality of said power converting units, each of the carrying units is provided with at least one said power converting unit, and the at least one power converting unit and the at least one resonant coil on each of the carrying units are electrically connected to each other, each of the insulating units includes an insulating portion and an electrical connecting portion, the insulating portion of each of the insulating units has one surface connected to one of the carrying units and another surface connected to another one of the carrying units, the electrical connecting portion of each of the insulating units is electrically connected to two of the power converting units, so that the respective power converting units are electrically connected.

Preferably, the carrying unit is a casing and defines an accommodating space by an outer wall, and the resonant coils are disposed in the accommodating space.

Preferably, each of the carrying units is a casing and defines an accommodating space by an outer wall, and the at least said resonant coil is disposed in the accommodating space.

To achieve the above objective, a power supply device in accordance with the present invention comprises:

a resonant coil including a resonant portion and a power transmission portion electrically connected to the resonant portion, wherein the resonance portion is capable of receiving electromagnetic waves, and converts electromagnetic waves into electric energy; and a power converting unit electrically connected to the power transmission portion to receive the electrical energy from the power transmission portion, and storing the electrical energy.

Preferably, the power supply device further comprises a carrying unit, and the resonant coil and the power converting unit are disposed on the carrying unit.

Preferably, the carrying unit is a casing and defines an accommodating space by an outer wall, and the resonant coil is disposed in the accommodating space.

Preferably, the power supply device further comprises a carrying unit, the resonant coil and the power converting unit are disposed on the carrying unit, the carrying unit is a casing and defines an accommodating space by an outer wall, and the resonant coil is disposed in the accommodating space.

To achieve the above objective, a method for using the power supply device in accordance with the present invention, comprises the following steps:

a step of trapping including: providing at least one resonant coil, and using the resonant coil to resonate with electromagnetic waves, thereby generating electrical energy; and a step of storing electrical energy including: providing a power converting unit for storing the electrical energy transmitted from the resonant coil.

Preferably, the method for using the power supply device further comprising a step of discharging after the step of storing electrical energy, and the power converting unit has a discharge port electrically connected to an electrical appliance.

A user uses the resonant coil to generate electrical energy by the resonance of the resonant coil with the electromagnetic waves in the environment. Since the electromagnetic waves existing in the environment are weak, the generated electrical energy is low. The present invention stores the generated micro-electricity in the power converting unit, and after the electrical energy is accumulated for a period of time, the power converting unit contains sufficient electrical energy for the user to use. Since the electric power converting unit does not need to store electricity through the power source, and only needs to use the electromagnetic waves in the environment to generate electrical energy, which not only facilitates the user to store electricity in the power converting unit, but also allows the user to utilize electromagnetic waves that are not used in the natural environment in the first place, thereby allowing resources to be more effectively utilized.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

The present invention will be clearer from the following description when viewed together with the accompanying drawings, which show, for purpose of illustrations only, the preferred embodiment in accordance with the present invention.

Figure 1:
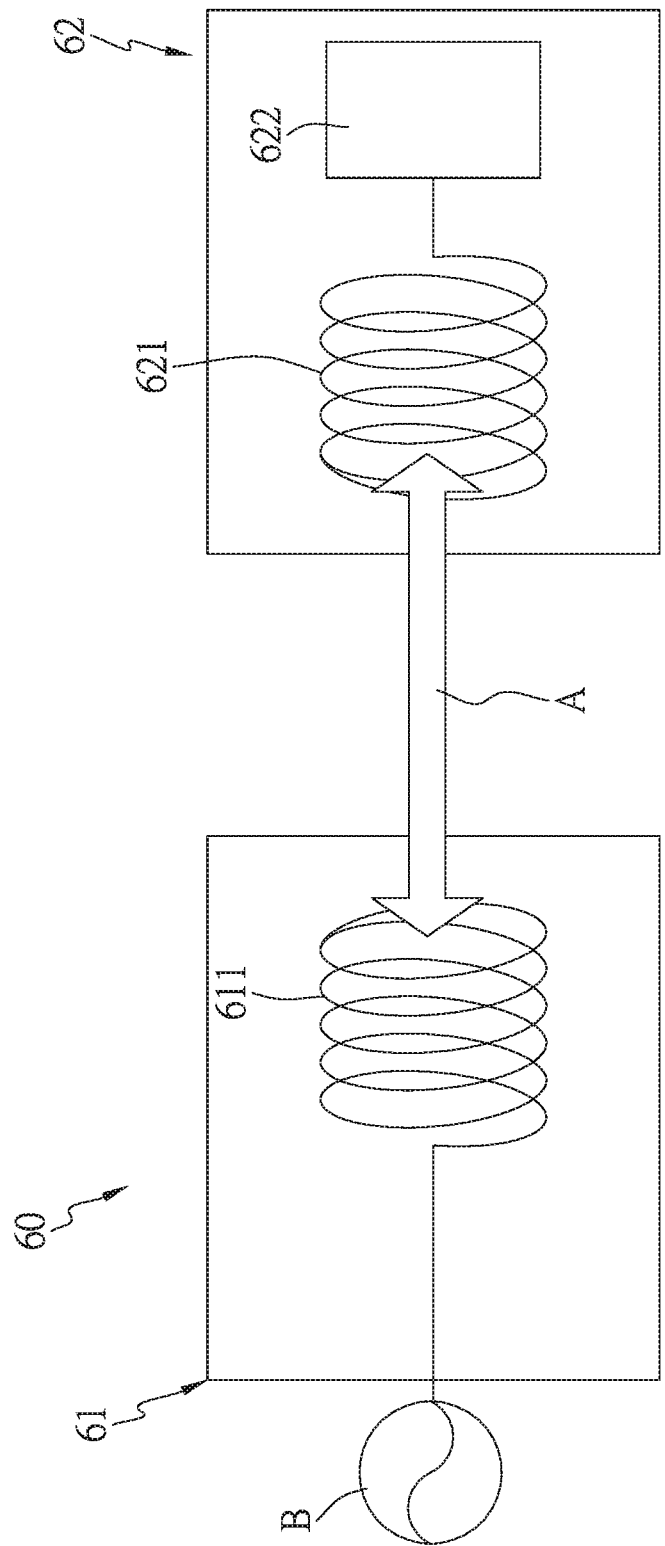
FIG. 1 is a schematic structural diagram of a conventional wireless charging coil.
Figure 2:
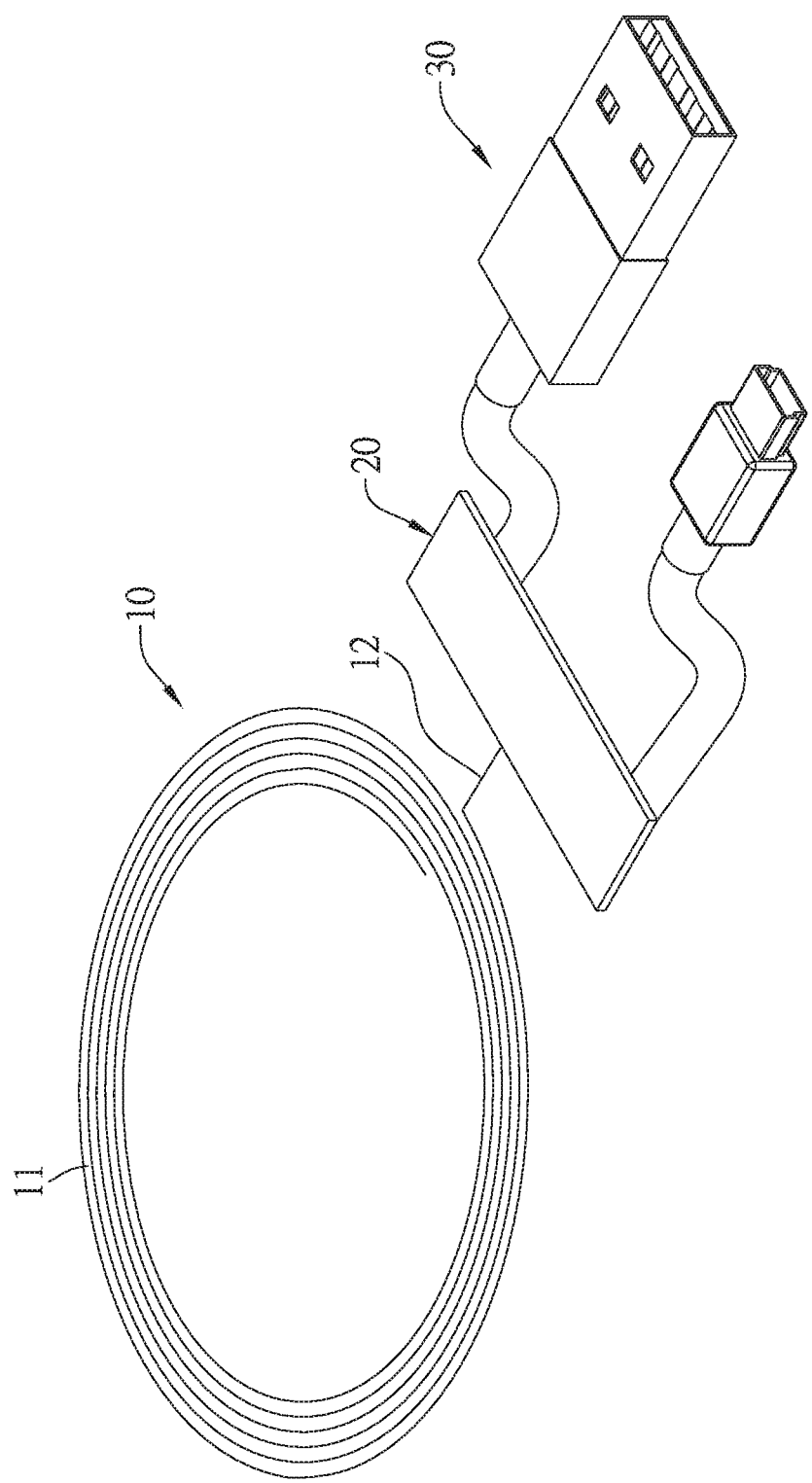
FIG. 2 is a perspective view of a first embodiment of the present invention.
Figure 3:
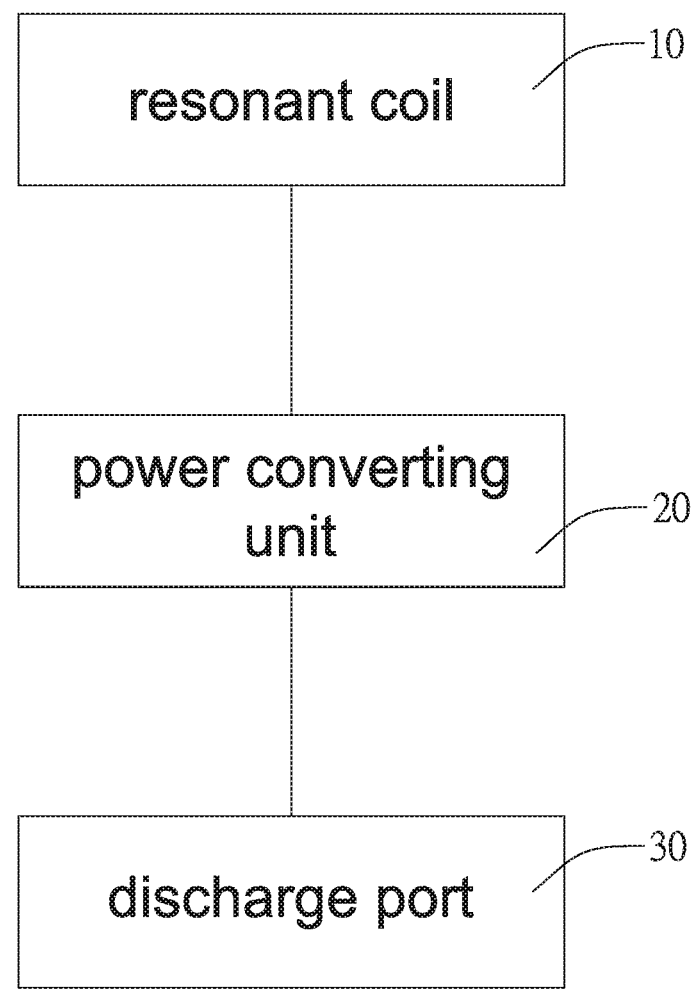
FIG. 3 is a structural view of the present invention in the first embodiment.

Referring to FIGS. 2 and 3, a first embodiment of the present invention is a power supply device for receiving an electromagnetic wave, which is an electromagnetic wave generated by an environment, and the power supply device includes: a resonant coil 10 and a power converting unit 20.

The resonant coil 10 has a resonant portion 11 and a power transmission portion 12 electrically connected to the resonant portion 11. The resonant portion 11 is an annular coil, and the resonant portion 11 is capable of generating resonance with respect to the electromagnetic wave, and converting the electromagnetic wave into electrical energy by the resonance phenomenon.

In this embodiment, the material of the resonant coil 10 includes a conductive metal or conductive non-metal material, such as graphene, gold, silver, copper, iron or tin, etc.

The power converting unit 20 is electrically connected to the power transmission portion 12 to receive the electrical energy from the power transmission portion 12, and stores the power.

In particular, when the number of coils in the coil of the resonant portion 11 is different, the frequency that the resonant portion 11 can capture is also different. In detail, the principle is to transmit electrical energy by using the resonance caused by the same frequency of the transmitter of the transmitting end and the object to be charged.

The present invention does not use the power transmitter to output electrical energy, when the magnetic field of the resonant portion 11 of the resonant coil 10 is coincident with the magnetic field of the electromagnetic waves in the environment, the resonant portion 11 of the resonant coil 10 will vibrate, then resonance is produced in the resonant portion that receives the electromagnetic wave to consequently produce electrical energy by the resonance effect, and the electrical energy is finally stored in the power converting unit 20 for reuse.

Preferably, the power converting unit 20 is further connected to a discharge port 30, which can be a common USB Type-C connector, a Lightning connector, a Type-A connector, a Type-B connector, a Mini-A connector, a Mini-B connector, a Micro-A connector, a Micro-B connector or a simple wire connection, so that the discharge port 30 can be widely used in electrical or electronic products (such as mobile phones, notebooks, etc.) with ports of different specifications, and the electrical energy stored in the power converting unit 20 can be outputted to the to-be-used electronic or electrical products by the discharge port 30. Since the electrical energy stored in the power converting unit 20 can be used by different devices, the power converting unit 20 is capable of converting its stored direct current into alternating current and outputting electrical energy of different voltages by the discharge port 30.

Figure 4:
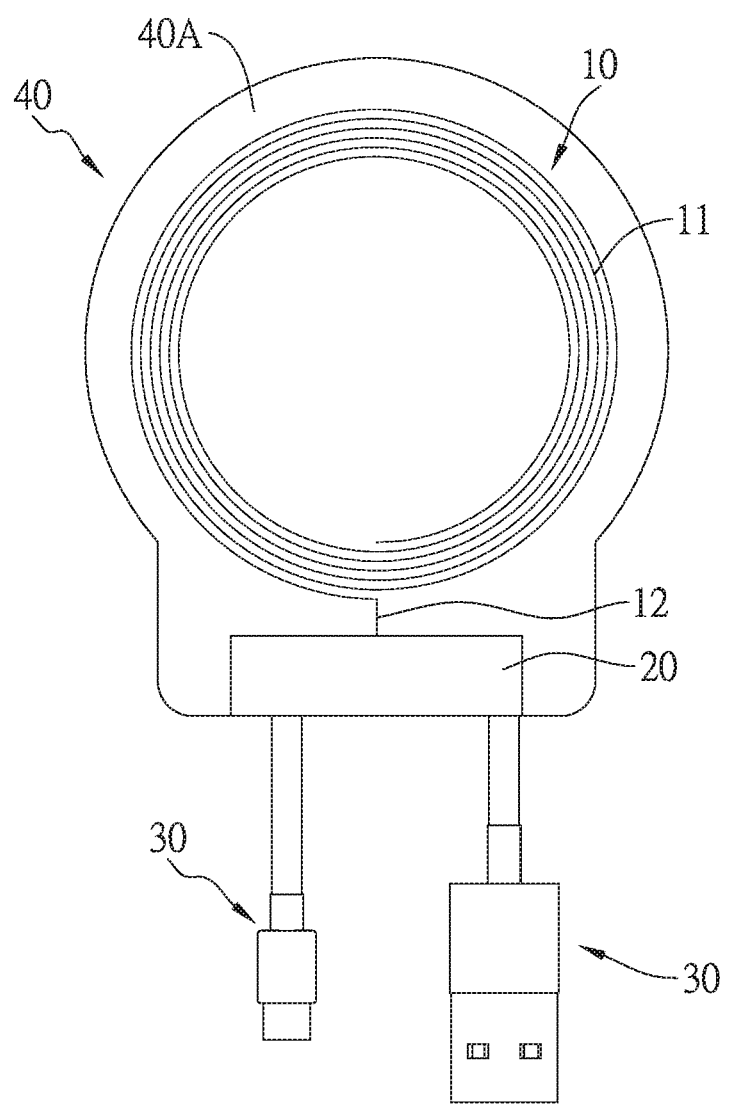
FIG. 4 is a plan view of the present invention in a second embodiment.

Referring to FIG. 4, a second embodiment of the present invention further includes a carrying unit 40, the resonant coil 10 and the power converting unit 20 are disposed on the carrying unit 40, and the carrying unit 40 can be fixed or pasted to a specific position to be used, which is not only convenient for the user to use, but also prevents the resonant portion 11 of the resonant coil 10 from being deformed and cannot receive the electromagnetic wave.

More preferably, in the second embodiment, the carrying unit 40 can be an insulating film 40A, and the resonant coil 10 can be covered in the insulating film 40A, thereby protecting the resonant coil 10.

Figure 5:
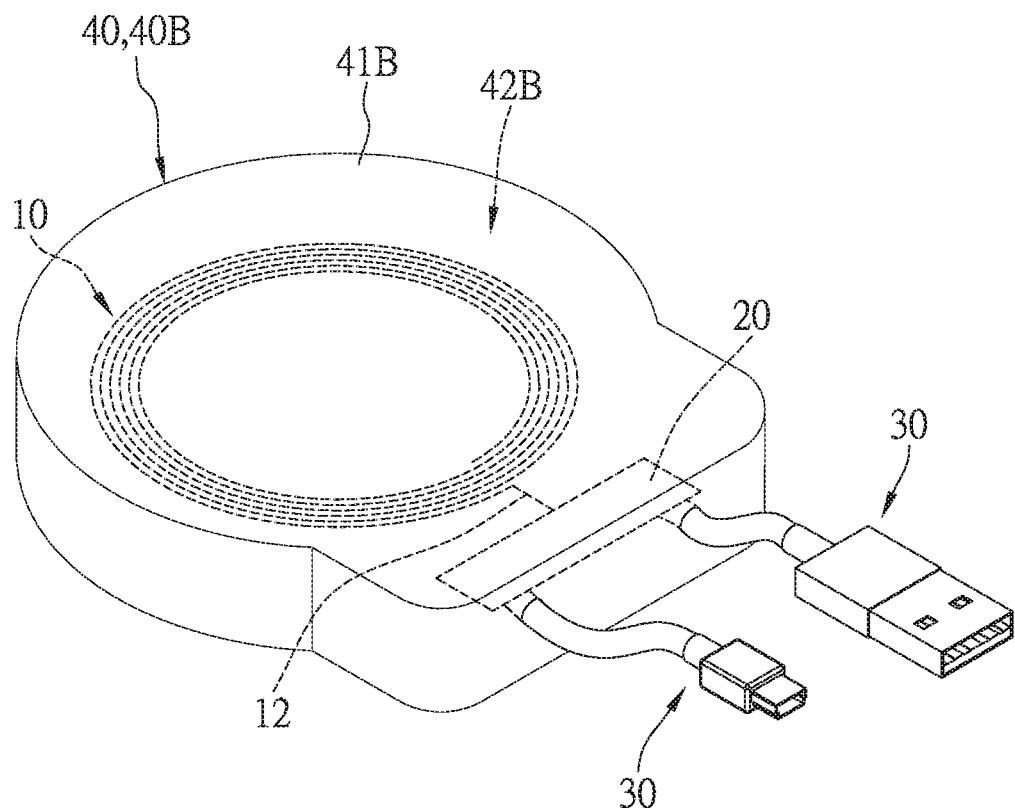
FIG. 5 is a perspective view of a third embodiment of the present invention.

Referring to FIG. 5, in a third embodiment, the carrying unit 40 is a casing 40B, and the carrying unit 40 defines an accommodating space 42B by an outer wall 41B. The resonant coil 10 is disposed in the accommodating space 42B, and the discharge port 30 is inserted through the outer wall 41B for connecting an external electrical appliance or an electronic device. The casing 40B can protect the resonant coil 10 from being damaged by collision.

Figure 6:
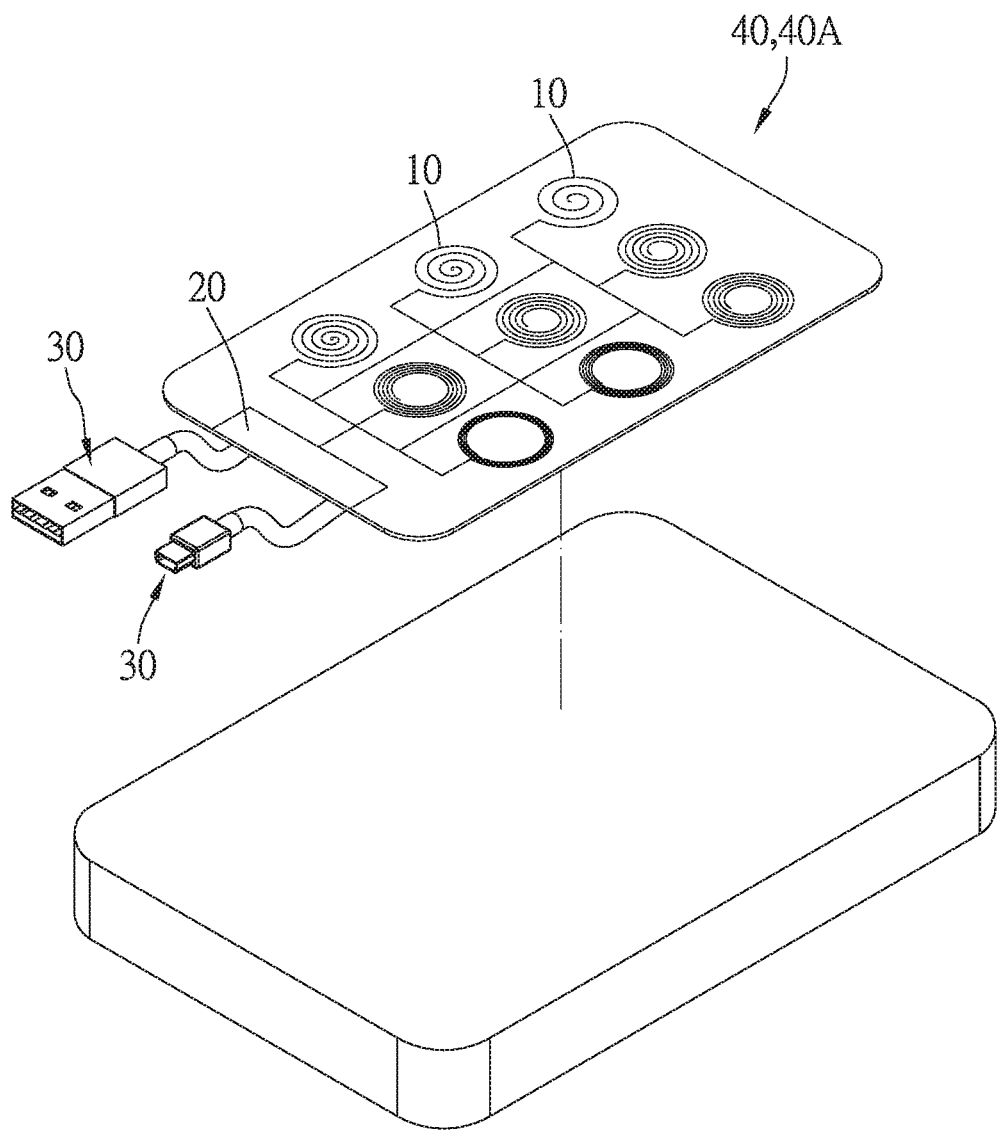
FIG. 6 is an exploded view of a fourth embodiment of the present invention.

Referring to FIG. 6, in a fourth embodiment, the number of the resonant coils 10 is plural, all the resonant coils 10 are fixed on the same carrying unit 40, and the number of loops (turns) in of the resonant portion 11 of each of the resonant coils 10 is different, so that the frequency of the electromagnetic wave that can be captured by each of the resonant coils 10 is completely different. Since the frequency of the electromagnetic wave that each of the resonant coils 10 can receive is fixed, if only one resonant coil 10 is used to receive the electromagnetic wave and produce electric energy, the energy can be collected is less. Using different resonant coils 10 to capture electromagnetic waves of different frequencies in the environment can generate more electrical energy, and the electrical energy is stored in the power converting unit 20. For example: one of the resonant coils 10 is capable of capturing electromagnetic waves having a frequency of 10 MHz in the environment, and the other of the resonant coils 10 is capable of capturing electromagnetic waves with a frequency of 100 kHz in the environment. When 10 MHz and 100 kHz electromagnetic waves exist in the environment, the resonant coil 10 capable of capturing electromagnetic wave of 10 MHz will resonate with 10 MHz electromagnetic wave to capture the electromagnetic wave of 10 MHz, and the resonant coil 10 capable of capturing electromagnetic wave of 100 MHz will resonate with 100 MHz electromagnetic wave to capture the electromagnetic wave of 100 MHz, so that the electromagnetic waves of both 10 MHz and 100 MHz can be captured to generate electrical energy.

In another example, each of the resonant coils 10 can capture an RF band of 3 kHz to 300 GHz and a subset thereof, and a microwave band of 1 GHz to 110 GHz, depending on the number of turns or loops in the respective resonant portions 11, so that the respective resonant coils 10 can generate electric energy via the electromagnetic waves of various frequencies, and the more frequencies of electromagnetic waves that can be captured, the more electric energy that can be generated.

Figure 7:
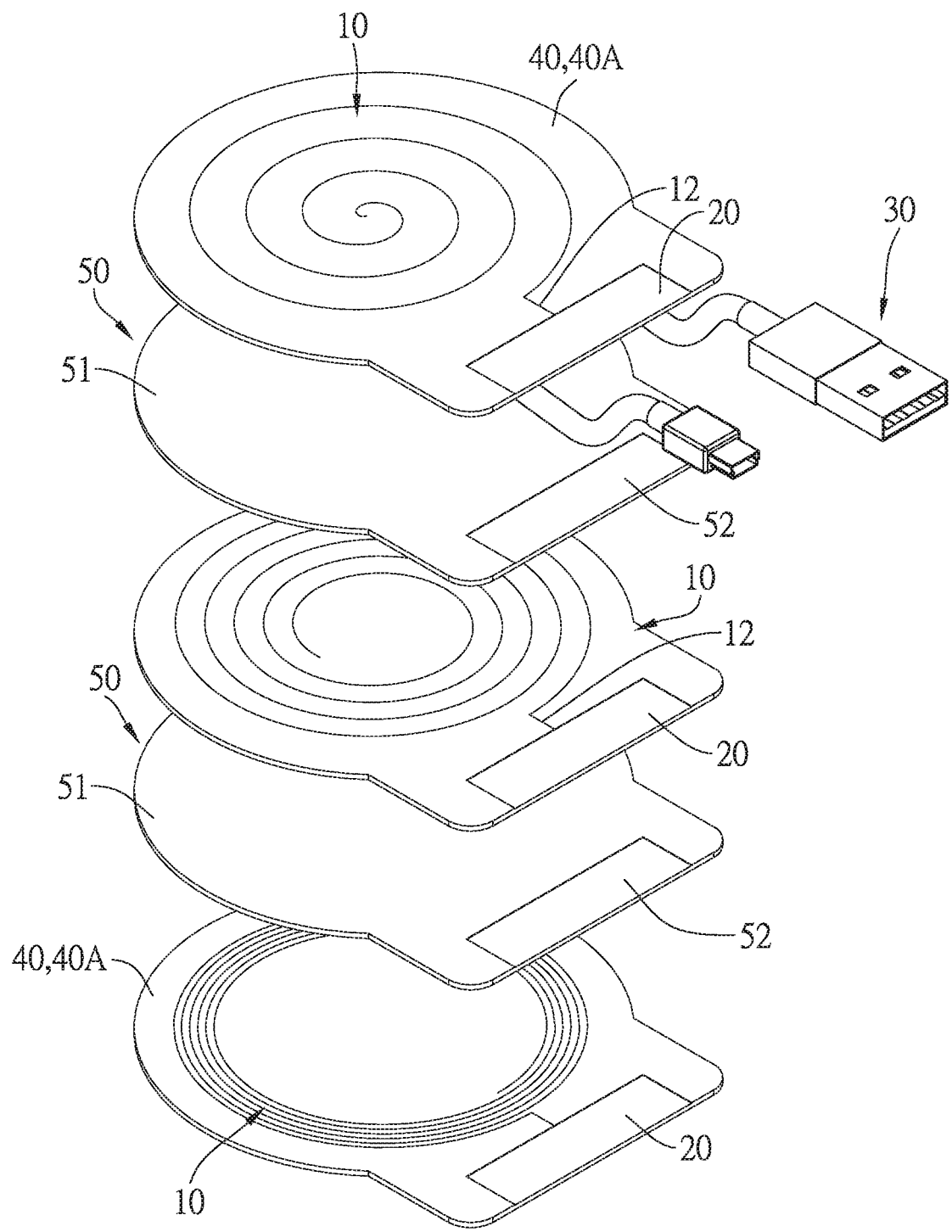
FIG. 7 is an exploded view of a fifth embodiment of the present invention.

Referring to FIG. 7, in a fifth embodiment, the number of the carrying units 40 is plural, and the number of the resonant coils 10 and the power converting units 20 is also plural. Each of the carrying units 40 is provided with a corresponding one of the resonant coils 10 and a corresponding one of the power converting units 20 that are electrically connected to each other, and the corresponding one of the power converting units 20 is provided with a discharge port 30. When the resonant coils 10 used by the user are thicker coils, the insulating film 40A of the second embodiment cannot be used for the resonant coils 10. Therefore, an insulating unit 50 is disposed between each two of the carrying units 40, and includes an insulating portion 51 and an electrical connecting portion 52. The insulating portion 51 of the insulating unit 50 has one surface connected to one of the carrying units 40 and another surface connected to another one of the carrying units 40 so as to isolate the two carrying units 40 by the insulating portion 51, so that the resonant coils on the carrying units 40 do not interfere with each other. The electrical connecting portion 52 of each of the insulating units 50 is electrically connected to two of the power converting units 20, thereby electrically connecting each of the power converting units 20 to the discharge port 30, and the resonant coils 10 on the two carrying units 40 do not interfere with each other. More preferably, since only one resonant coil 10 is disposed on each of the carrying units 40, the resonant portion 11 of each of the resonant coils 10 can contain more loops of wire, thereby generating more electrical energy after receiving electromagnetic waves.

Figure 8:
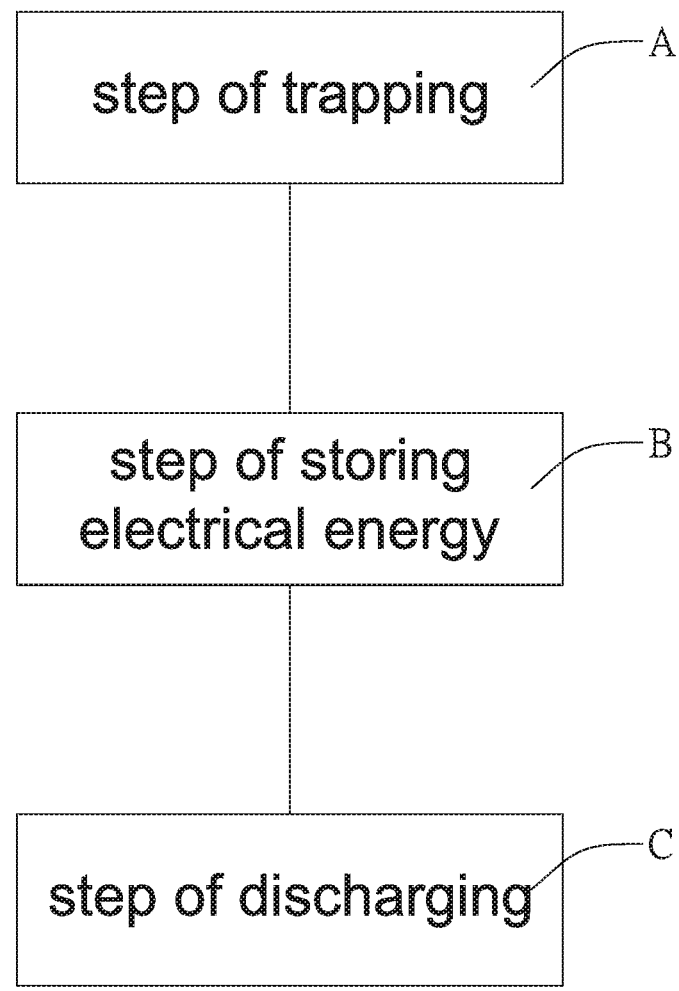
FIG. 8 is a flow chart of a method of using the power supply device of the present invention.

The above are the structural configuration and connection relationship of the first to fifth embodiments of the present invention. Referring to FIG. 8, a method for using the power supply device of the present invention is as follows:

A step A of trapping includes: providing the resonant coil 10, and using the resonant coil 10 to resonate with the electromagnetic wave, thereby generating the electrical energy;

A step B of storing electrical energy includes, providing the power converting unit 20 for storing the electrical energy transmitted from the resonant coil 10.

Preferably, the invention further includes a step C of discharging after the step B of storing electrical energy, the power converting unit 20 has the discharge port 30, and the discharge port 30 is electrically connected to an electrical appliance, thereby transmitting the electrical energy stored in the power converting unit 20 to the electrical appliance for use.

In natural environment there are electromagnetic waves emitted by AM stations, FM stations, telephone base stations, mobile communication stations, etc., or electromagnetic waves exist in the atmosphere environment in the first place, so that the user uses the resonant coil 10 to generate electrical energy by the resonance of the resonant coil 10 with the electromagnetic waves in the environment. Since the electromagnetic waves existing in the environment are weak, the generated electrical energy is low. The present invention stores the generated micro-electricity in the power converting unit 20, and after the electrical energy is accumulated for a period of time, the power converting unit 20 contains sufficient electrical energy for the user to use. Since the electric power converting unit 20 does not need to store electricity through the power source, and only needs to use the electromagnetic waves in the environment to generate electrical energy, which not only facilitates the user to store electricity in the power converting unit 20, but also allows the user to utilize electromagnetic waves that are not used in the natural environment in the first place, thereby allowing resources to be more effectively utilized.

While we have shown and described various embodiments in accordance with the present invention, it is clear to those skilled in the art that further embodiments may be made without departing from the scope of the present invention.

What is claimed is:

1. A power supply device, comprising;
   a plurality of resonant coils each having a resonant portion and a power transmission portion electrically connected to the resonant portion, wherein the resonance portion of each of the resonant coils respectively receives electromagnetic waves of a different frequency, and converts electromagnetic waves of different frequencies into electric energy;
   a plurality of carrying units, each of the carrying units being provided with at least one said resonant coil;
   a plurality of insulating units, at least one said insulating unit being disposed between each two of the carrying units; and
   a plurality of power converting units, each of the carrying units being provided with at least one said power converting unit, the at least one power converting unit and the at least one resonant coil on each of the carrying units being electrically connected to each other with the at least one power converting unit electrically connected to the power transmission portion of the at least one resonant coil to receive the electrical energy from the power transmission portion, and storing the electrical energy;
   wherein each of the insulating units includes an insulating portion and an electrical connecting portion, the insulating portion of each of the insulating units has one surface connected to one of the carrying units and another surface connected to another one of the carrying units, and the electrical connecting portion of each of the insulating units is electrically connected to two of the power converting units so that the respective power converting units are electrically connected.

2. The power supply device as claimed in claim 1, wherein each of the carrying units is a casing and defines an accommodating space by an outer wall, and the at least one said resonant coil is disposed in the accommodating space.

* * * * *